United States Patent
Azuma et al.

(10) Patent No.: US 6,417,657 B2
(45) Date of Patent: Jul. 9, 2002

(54) POWER SOURCE CONNECTION CONTROLLER AND POWER SOURCE CONNECTION CONTROLLING METHOD

(75) Inventors: Keiichi Azuma, Ohtsu; Tsuneo Takahara, Kitakyushu, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/873,051

(22) Filed: Jun. 1, 2001

(30) Foreign Application Priority Data

Jun. 21, 2000 (JP) .......................... 2000-185650

(51) Int. Cl.⁷ .................................. G05F 1/40
(52) U.S. Cl. .......................... 323/351; 307/38
(58) Field of Search ............... 323/282, 283, 323/284, 351; 307/31, 35, 38, 39; 700/286, 295, 297

(56) References Cited

U.S. PATENT DOCUMENTS

| | | | |
|---|---|---|---|
| 4,125,782 A | * 11/1978 | Pollnow, Jr. | 307/35 |
| 4,817,045 A | * 3/1989 | Faeser | 700/293 |
| 5,359,540 A | * 10/1994 | Ortiz | 700/295 |

* cited by examiner

Primary Examiner—Adolf Deneke Berhane
(74) Attorney, Agent, or Firm—J. Bruce Schelkopf

(57) ABSTRACT

To easily and quickly return from a power-off state, as well as reducing power consumption of an electrical apparatus by an automatic power-off, a power supply source connection controller 10 comprises: a power source connecting switch R0-2; a relay R0 for controlling the opening and closing of the switch R0-2; control switches SW1, SW2, and SW3 for sending a signal to a microcomputer 72 to provide instructions for executing a predetermined function, as well as connecting a power supply circuit 74 to the relay R0; a connection holding switch R0-1 for holding a connection between the relay R0 and the circuit 74; and a connection releasing switch SW0 for releasing a connection between the relay R0 and the circuit 74.

12 Claims, 9 Drawing Sheets

POWER SOURCE CONNECTION CONTROLLER AND POWER SOURCE CONNECTION CONTROLLING METHOD

BACKGROUND OF THE INVENTION

1. Field of the Invention

The present invention relates to a controller for controlling power source connections to a circuit in an electrical apparatus and a method thereof. More particularly, it relates to a power source connection controller for automatically disconnecting a power source of an electrical apparatus and returning from an automatic power-off state and a method thereof.

2. Description of Related Art

Microcomputers are included in various types of electrical apparatuses as an internal circuit. FIG. 8 shows an example of connection among a microcomputer 72, a power supply circuit 74, and control switches SW1, SW2, and SW3. The microcomputer 72 is connected to the power supply circuit 74 via a power source connecting switch SWPW. On closing the switch SWPW, a predetermined voltage is applied to the microcomputer 72. The circuit 74 converts and/or regulates a voltage supplied from a power source (not shown). A battery may be used for a power source. An ordinary plug socket wired within a house may be also used as a power source. In FIG. 8, the circuit 74 supplies a voltage E required for operation of the microcomputer 72 between terminals INp and Inn.

The microcomputer 72 shown in FIG. 8 has 3 inputs (I/O-1, I/O-2, and I/O-3) and one output (I/O-0). I/O-1 is connected to ground via the switch SW1. I/O-2 and I/O-3 are respectively connected to ground via the switches SW2 and SW3 as well. "Ground" is not always limited to a ground voltage level, but it may be any desired voltage level. SW1, SW2, and SW3 are push-button switches. The contacts S1c and S2d of SW1 are normally open, and closed while pressing SW1. The contacts S2c and S2d, and the contacts S3c and S3d are similarly closed while pressing the switches SW2 and SW3.

Predetermined functions (Function 1, Function 2, and Function 3) executable by a microcomputer are assigned to each control switch (SW1, SW2, and SW3). Since I/O-1 is connected to ground after SW1 is pressed, the microcomputer 72 detects that I/O-1 has been connected to the ground, and executes Function 1 assigned to SW1. Similarly, on pressing SW2 and SW3, the microcomputer 72 respectively executes Function 2 and Function 3. It is necessary to keep pressing a control switch for a predetermined time sufficient to allow the microcomputer 72 to recognize that the control switch has been pressed. Generally, keeping a press of a control switch for tens to hundreds milliseconds will be sufficient for the microcomputer 72 to recognize that the control switch has been pressed.

A power-off signal PWOFF for opening the power source connecting switch SWPW is outputted from I/O-0 of the microcomputer 72. If any of control switches SW1, SW2, and SW3, for example, have never been pressed within a predetermined time, the signal PWOFF is automatically sent from the microcomputer 72. If a predetermined time has elapsed since a control switch was pressed the last time, the power source is automatically shut off.

FIG. 8 illustrates closing and opening of the connecting switch SWPW between the power supply circuit 74 and the microcomputer 72. There may be a case where a connecting switch SWP1 is provided between a power source 76 and the power supply circuit 74 as shown in FIG. 9 (a) because actual electrical apparatus may include a device other than a microcomputer as well. In FIG. 9 (a), the power source 76 can be disconnected from an entire electrical apparatus 70 including the microcomputer 72 by opening SWP1. As shown in FIG. 9 (b), a connecting switch SWP2 between the circuit 74 and other device 80 may be opened and closed. In FIG. 9 (b), the other device 80 is disconnected from the circuit 74 by opening only SWP2, so that the microcomputer 72 may remain connected to the circuit 74.

In FIG. 9 (a), the switch SWP1 for connecting the power source 76 to the power supply circuit 74 for supplying a required voltage to the microcomputer 72 and other device 80 is opened by the power-off signal PWOFF sent from the microcomputer 72. After SWP1 is opened, power supply to the entire electrical apparatus including the microcomputer 72 is cut off. Power consumption of the electrical apparatus 70 at this time is zero. When operation is not performed for a predetermined time, it is possible to prevent power consumption by automatically disconnecting the power source 76. However, the power supply needs to be reconnected to operate the electrical apparatus 70 again because the power source 76 is completely turned off. It is necessary to close the switch SWP1 by the power switch SWPW before pressing the control switches SW1, SW2, and SW3.

In FIG. 9 (b), the switch SWP2 for connecting the power supply circuit 74 to other device 80 is opened by a power-off signal PWOFF from the microcomputer 72. Upon opening of SWP2, power supply to other device 80 is shut off. Since SWP1 for connecting the power source 76 to the power supply circuit 74 keeps closed, a required voltage is supplied from the circuit 74 to the microcomputer 72. The power consumption of an electrical apparatus 78 in this case does not become zero because the circuit 74 and the microcomputer 72 consume power. On pressing SW1, SW2 or SW3, the microcomputer 72 automatically closes SWP2 to enable other device 80 and performs the function assigned to the pressed manipulation switch button. It is not necessary to turn on the power source afresh like the electrical apparatus 70 shown in FIG. 9 (a), but in FIG. 9 (b), the power consumption does not become zero due to continued power supply to the microcomputer 72.

SUMMARY OF THE INVENTION

It is an object of the present invention to provide a technique which can reduce power consumption of an electrical apparatus by an automatic power-off and in addition can perform easily and quickly return from the automatic power-off state. A power source connection controller according to the present invention comprises: (a) a power source connecting switch connected between a power source and an internal circuit of an electrical apparatus; (b) means for controlling opening and closing of the power source connecting switch, the controlling means being connected between the power source and the power source connecting switch; (c) a first switch for inputting a signal to the internal circuit to provide instructions for executing a predetermined function provided for the electrical apparatus; and (d) a second switch for causing the controlling means to close the power source connecting switch, the second switch being connected between the power source and the controlling means, the first and second switches operating jointly. Upon receipt of a power-off signal from the internal circuit, the controlling means releases the power source connecting switch from closed state. The power source connection controlling method according to the present invention includes the steps of: providing instructions for an internal circuit to execute a predetermined function provided for the electrical apparatus, while the power source is shut off, connecting the power source to the internal circuit in synchronization with the instruction to the internal circuit; and allowing the internal circuit to execute the predetermined function after the power source is connected to the internal circuit. The power source connection controlling method further includes a step of disconnecting the power source from the internal circuit in response to the power-off signal, from the internal circuit.

According to the present invention, when control switches are not pressed for a predetermined time or longer, power consumption can be reduced to zero by automatically cutting off a power source. When an electrical apparatus is not in active use, its power consumption can be reduced. Even if the power source is in a power-off state, the power source is automatically turned on by pressing a control switch, and then a microcomputer is actuated. An easy and quick return from the automatic power-off state is possible. Users can carry out operations without being conscious of ON/OFF of the power source.

BRIEF DESCRIPTION OF THE DRAWINGS

FIG. 2 (b) is a view of the switch shown in FIG. 2 (a) as viewed from X direction. FIG. 2 (c) shows another example of a control switch.

FIG. 9 (b) is a block diagram showing another example of a power-off of the conventional electrical apparatus.

DETAILED DESCRIPTION OF THE INVENTION

Figure 8:
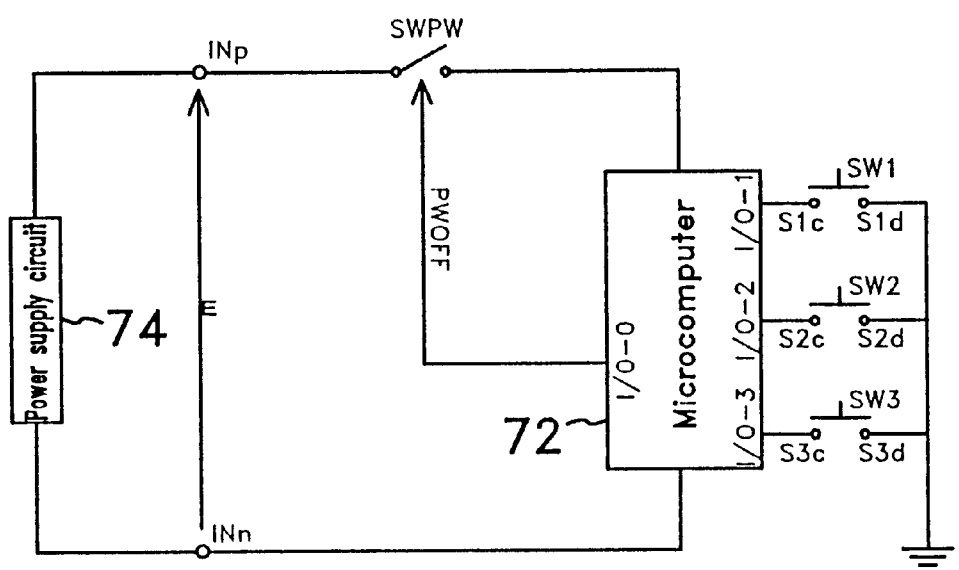
FIG. 8 is a schematic circuit diagram showing an example of an electrical apparatus having a conventional power-off function.

A preferred embodiment of a power source connection controller and a method thereof according to the present invention will be described hereinafter in detail with reference to the drawings. In this embodiment, a connection control between a power supply circuit and a microcomputer-containing electrical apparatus will be mainly described. A power supply circuit and a microcomputer similar to conventional ones (FIG. 8) are used in this embodiment.

Figure 1:
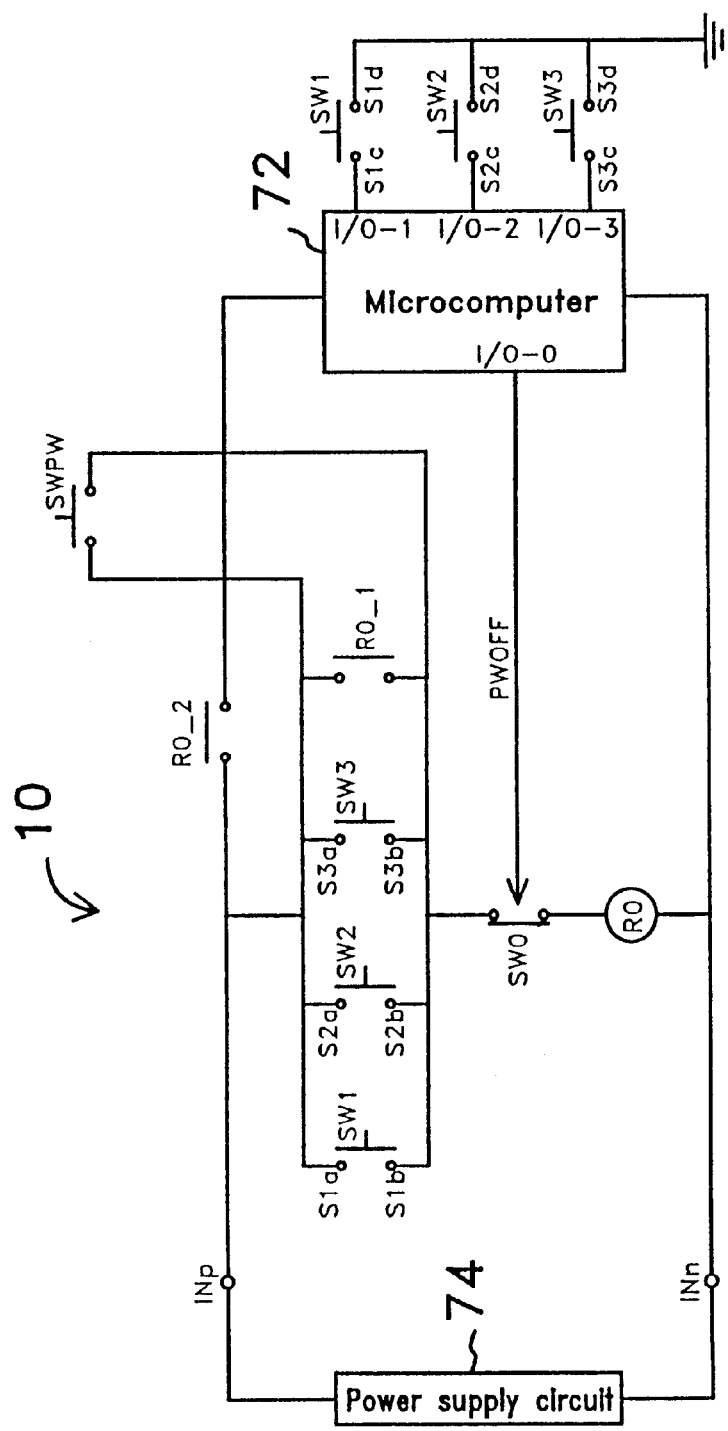
FIG. 1 is a schematic circuit diagram showing an example of an electrical apparatus including a power source connection controller according to the present invention.

As shown in FIG. 1, a power supply source connection controller 10 is connected between a power supply circuit 74 and a microcomputer 72. The power supply source connection controller 10 includes a power source connecting switch R0-2 for connecting the power supply circuit 74 to the microcomputer 72, a relay R0 for controlling the opening and closing of the switch R0-2, control switches SW1, SW2, and SW3 for inputting a signal to the microcomputer 72 to provide instructions for executing predetermined functions, as well as connecting the circuit 74 to the relay R0, and a connection holding switch R0-1 for holding the connection between the relay R0 and the circuit 74. The controller 10 further includes a connection releasing switch SW0 for disconnecting between R0 and the circuit 74.

The power source connecting switch R0-2 and the connection holding switch R0-1 are "a" contacts (normally open) of the relay R0. The switches R0-1 and R0-2 are closed by the excitation of R0 while the power supply circuit 74 is connected to R0. The connection releasing switch SW0 is "b" contacts (normally closed) of a relay (not shown) excited by a power-off signal PWOFF outputted from the microcomputer 72. The signal PWOFF is a pulse-like signal lasting a predetermined time, so that the switch SW0 is in an open state for the predetermined time after the signal PWOFF is outputted from the microcomputer 72. As in the prior art, the signal PWOFF is outputted from the microcomputer 72, for example, when none of the control switches has ever been closed within a predetermined time.

Figure 2A:
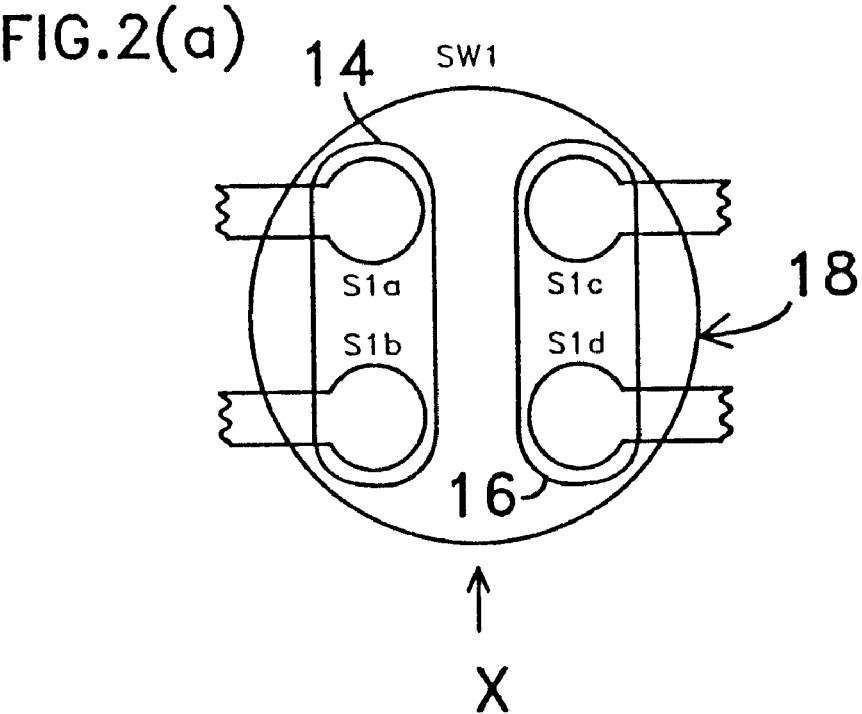
FIG. 2 (a) shows an example of contact structure of a control switch.
Figure 2B:
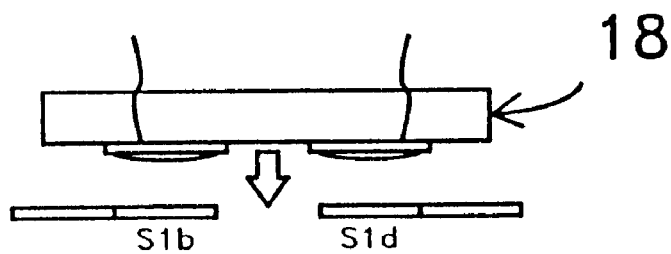
Figure 2C:
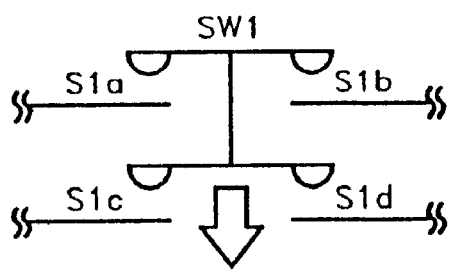

The control switches SW1, SW2, and SW3 simultaneously open and close two sets of contacts. For example, as shown in FIGS. 2 (a) and 2 (b), SW1 includes two connecting parts 14 and 16. When a switch button 18 is pressed, the connecting part 14 closes between contacts S1a and S1b, and the connecting part 16 closes between contacts S1c and S1d. In a similar manner, SW2 opens and closes two sets of contacts S2a and S2b, and S2c and S2d. And SW3 opens and closes two sets of contacts S3a and S3b, and S3c and S3d. Only one-time operation enables to close two sets of contacts simultaneously. Keeping a press of a control switch for more than a preset recognition time (for example, tens milliseconds to hundreds milliseconds) allows the microcomputer 72 to recognize an input signal from the control switch.

SW1, SW2, and SW3 shown in FIG. 1 are connected to each other in parallel. The power source switch SWPW similar to the conventional switch (FIGS. 9 (a) and 9 (b)) is connected to SW1, SW2, and SW3 in parallel as well. SWPW is hereinafter referred to as a main power switch.

The contact S1c of SW1 is connected to I/O-1 of the microcomputer 72, the contact S2c of SW2 is connected to I/O-2, and the contact S3c of SW3 is connected to I/O-3. The contacts S1d of SW1, S2d of SW2, and S3d of SW3 are connected to ground.

The connection holding switch R0-1 controlled by the relay R0 is connected to SW1, SW2, and SW3 in parallel. The connection releasing switch SW0 opened by the power-off signal PWOFF sent from the microcomputer 72 is connected to R0-1 and SW1, SW2, and SW3 in series. R0 is connected to SW0 in series.

Next, a description will be given to the operation of such power source connection control for a microcomputer-containing electrical apparatus.

Figure 3:
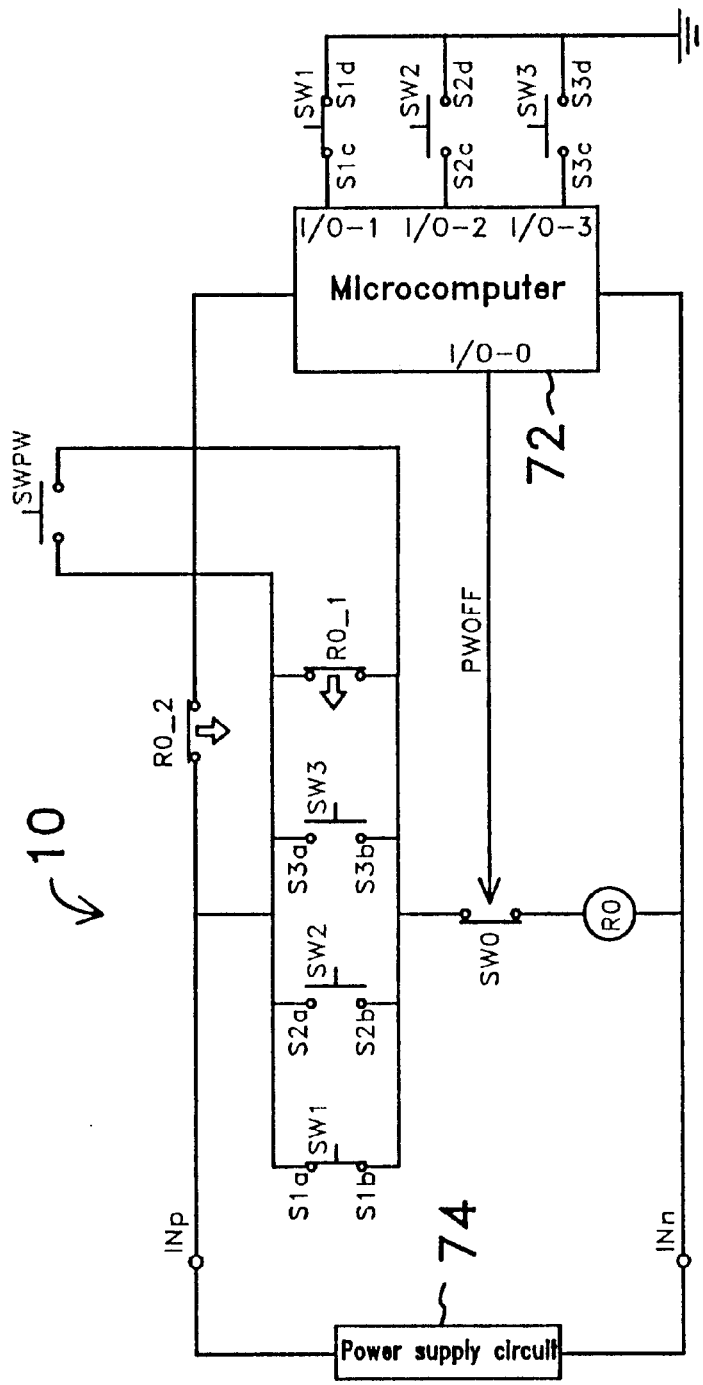
FIG. 3 is a schematic circuit diagram of the power source connection controller shown in FIG. 1 at the time of connecting a power source.

When the main power switch SWPW is pressed, the relay R0 is connected to the power supply circuit 74 and excited. As shown in FIG. 3, switches R0-1 and R0-2 are closed by excitation of R0, and then the power supply circuit 74 is connected to be the microcomputer 72. The connection between R0 and the circuit 74 is retained because of the closing of R0-1. The closed state of R0-2 is retained due to the holding of the connection between R0 and the circuit 74.

For example, on pressing the control switch SW1 in the state of FIG. 3, SW1 closes so that I/O-1 is connected to ground to allow the microcomputer 72 to recognize that SW1 has been pressed. The microcomputer 72 executes a predetermined function assigned to SW1.

Figure 4:
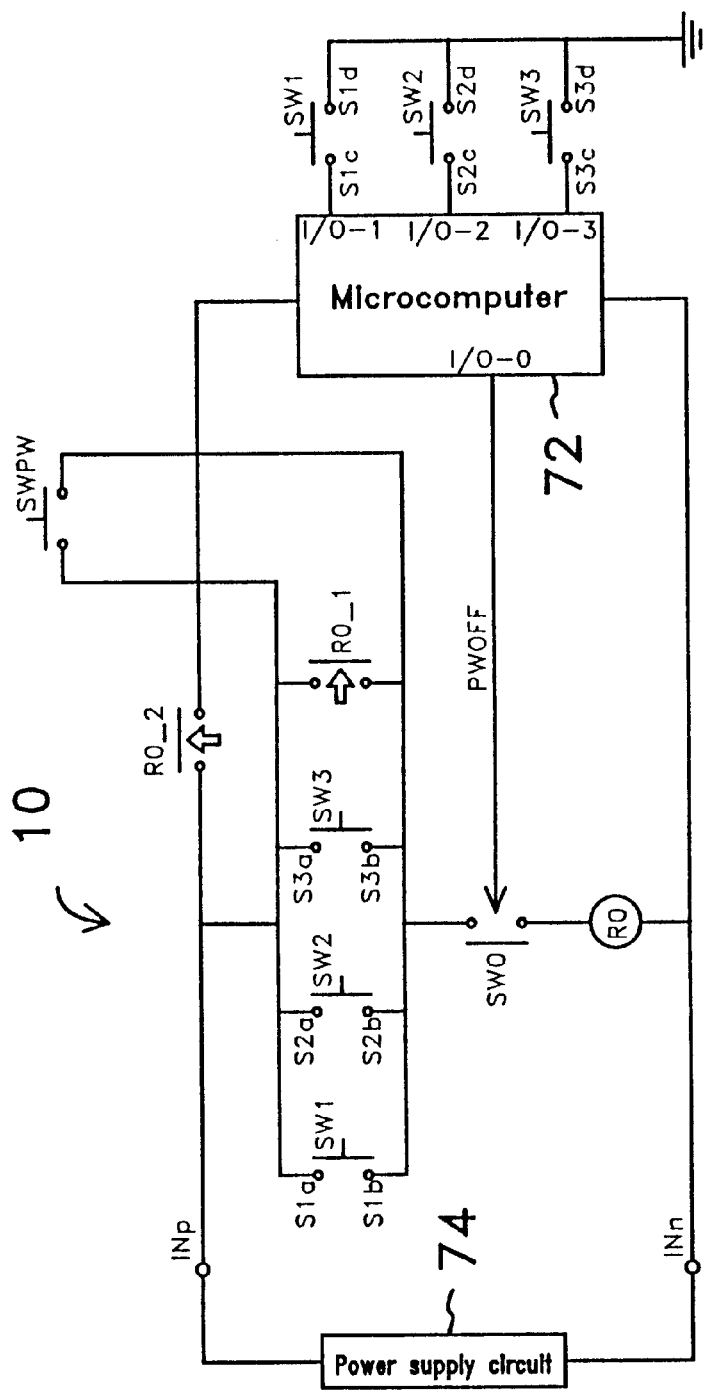
FIG. 4 is a schematic circuit diagram of the power source connection controller shown in FIG. 1 at the time of power-off.

The microcomputer 72 counts time from zero each time a control switch is pressed. When the count value reaches a predetermined value or greater with no control switch pressed, the microcomputer 72 sends the power-off signal PWOFF to SW0. As shown in FIG. 4, SW0 is opened in response to the signal PWOFF. The connection between the relay R0 and the power supply circuit 74 is disconnected by the opening of SW0. As a result, the holding of the closed state of R0-1 and R0-2 is released. The connection between the microcomputer 72 and the circuit 74 is cut off by the opening of R0-2. Since R0-1 is opened, the connection between R0 and the circuit 74 remains disconnected, even if SW0 returns into a closed state.

In the state of FIG. 4, the power supply circuit 74 is not connected to the microcomputer 72. Power consumption is reduced to zero due to no power supply to the microcomputer 72. When the control switches are not pressed for the predetermined time or longer, the power supply source connection controller 10 enables power consumption to be reduced to zero by automatically shutting off the power source.

In the state that the power source is disconnected as shown in FIG. 4, for example, if SW1 is pressed, as shown in FIG. 3, the connection between the contacts S1c and S1d is made at the same time when the connection between the contacts S1a and S1b is made. The connection between S1a and S1b causes the power supply circuit 74 to be connected to R0. Then R0 is energized by the circuit 74 and operates to close R0-1 and R0-2. The closing of R0-2 causes the circuit 74 to be connected to the microcomputer 72. The closing of R0-1 functions to hold the connection between R0 and the circuit 74.

When S1c and S1d are connected, the microcomputer 72 recognizes that SW1 has been pressed. SW1 should be pressed during a time period at least equal to the total of time Tr from the pressing of SW1 to the closing of R0-2 by activation of the relay R0, time Tm from the closing of R0-2 till the microcomputer 72 becomes operable, and time Tb required for the microcomputer 72 to recognize the press of the control switch.

In a general press-button switch, keeping a press of the button for tens milliseconds to hundreds milliseconds will be sufficient to cause the microcomputer 72 to recognize the pressing of the button. When the time Tb is set to hundreds milliseconds, the time Tr and Tm is far shorter than Tb, so that Tr and Tm may be ignored. The operations of the control switches SW1, SW2, and SW3 are similar to those of conventional press-button switches.

When SW1, SW2, and SW3 are pressed without pressing the main power switch SWPW, power is automatically supplied to activate the microcomputer 72. It is not necessary to turn on SWPW anew before pressing SW1, SW2, and SW3. Users can perform operations without awareness of ON/OFF of the power source.

One embodiment according to the present invention has been described so far on the basis of the accompanying drawings, but the present invention is not limited to this embodiment. For example, when all of the control switches provided for an electrical apparatus are press-button switches which simultaneously closes two sets of contacts, the main power switch SWPW may be omitted. The control switches are not limited to press-button switches, but any arbitrary switches can be used.

Figure 5:
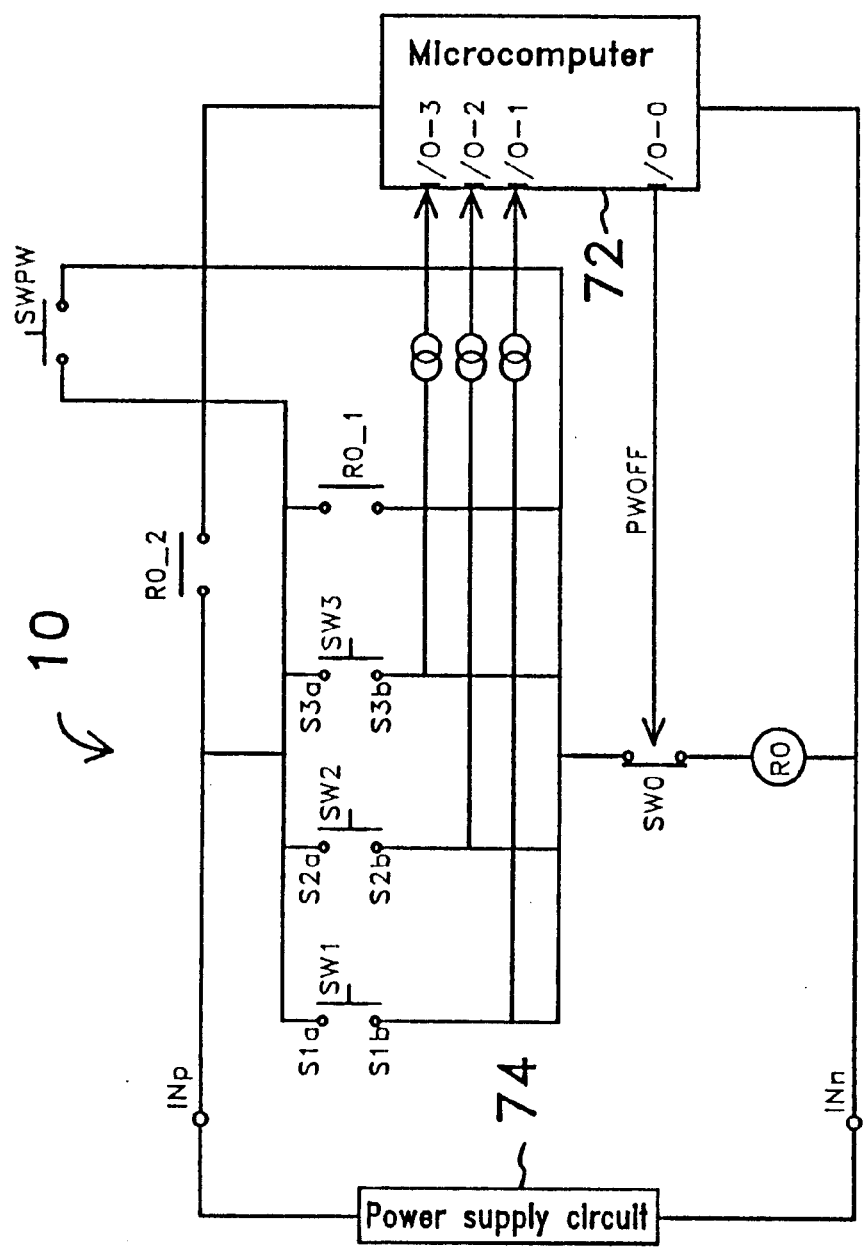
FIG. 5 is a schematic circuit diagram showing another example of an electrical apparatus including the power source connection controller according to the present invention.

As shown in FIG. 5, switches having only a set of contacts may be used for the control switches. In FIG. 5, the contact S1b of SW1 is connected to I/O-1 of the microcomputer, the contact S2b of SW2 is connected to I/O-2 of the microcomputer, and the contact S3b of SW3 is connected to I/O-3 of the microcomputer. For example, upon press of SW1, the contacts S1a and S1b are connected to close the switches R-01 and R-02 so that a signal is inputted to I/O-1. While the microcomputer shown in FIG. 1 detects that a switch has been pressed when any I/O terminal is grounded, the microcomputer shown in FIG. 5 detects that a switch has been pressed when a signal is inputted to any I/O terminal.

The relay R0 is not limited to a contact relay as shown in this embodiment, but a contactless relay or an electronic relay may be used.

Figure 6:
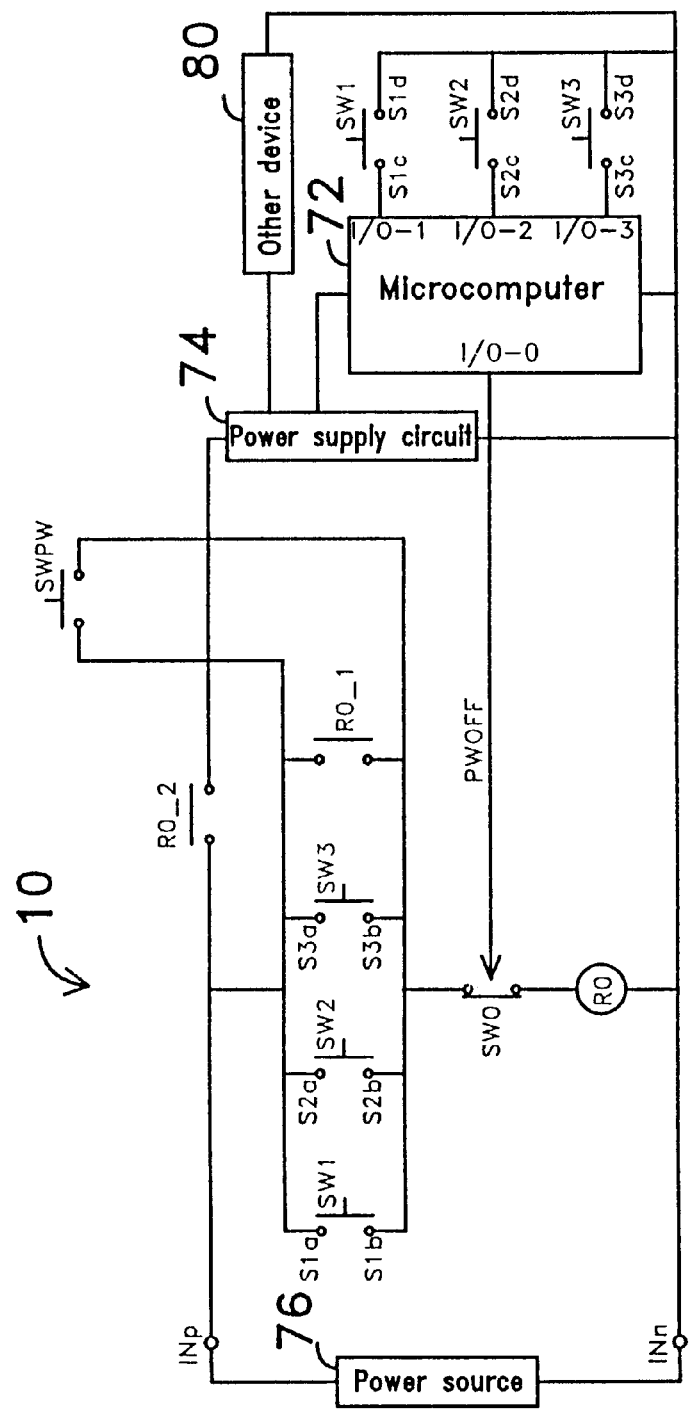
FIG. 6 is a schematic circuit diagram showing still another example of an electrical apparatus including the power source connection controller according to the present invention.
Figure 9A:
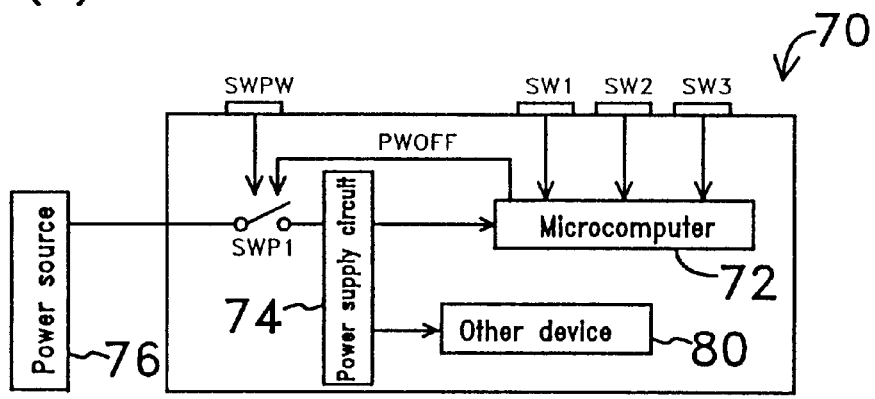
FIG. 9 (a) is a block diagram showing an example of a power-off of a conventional electrical apparatus.
Figure 9B:
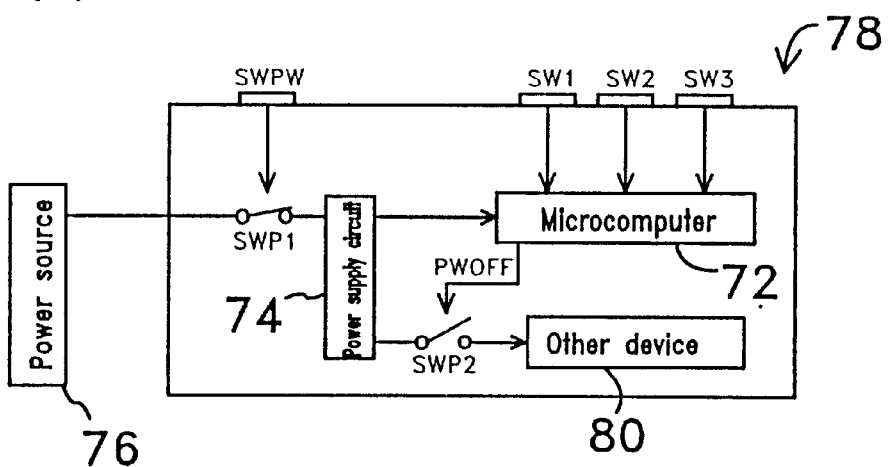

The power source connection controller and the method thereof according to the present invention may be used for the connection control of the power source 76 and the circuit 74 shown in FIG. 9 (a). As shown in FIG. 6, the power supply source connection controller 10 is connected between the power source 76 and the power supply circuit 74.

When the power source 76 shown in FIG. 9 (a) is a 100V alternating current power source, the power supply circuit 74 may preferably comprise a switching regulator to obtain a direct current voltage. In FIG. 9 (a), power supply to the microcomputer is additionally delayed by the time required for the power supply circuit 74 to start its operation. When the delay is represented as Ts, the time for keeping a press of a control switch is required to be longer than the following:

$$Tr+Tm+Tb+Ts$$

Figure 7:
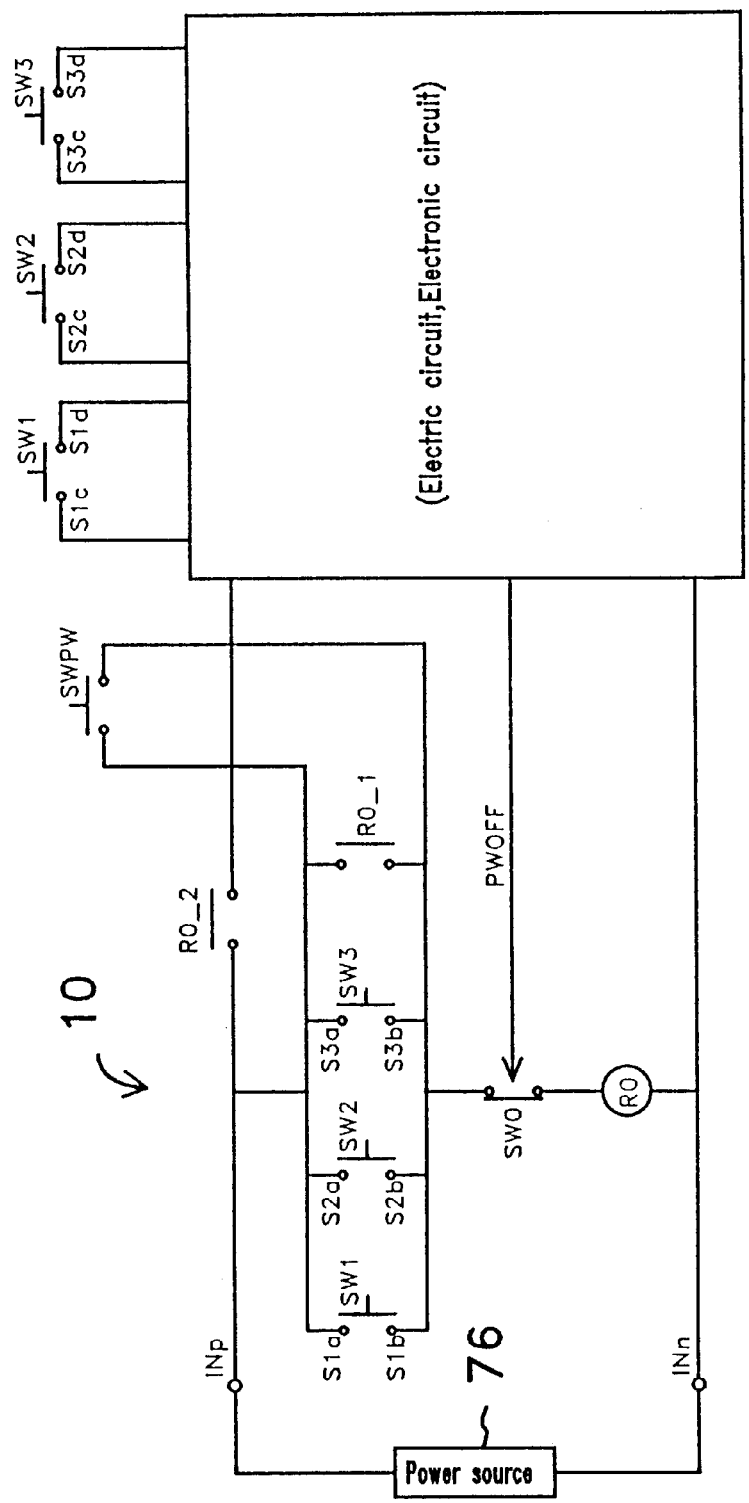
FIG. 7 is a schematic circuit diagram showing a further example of an electrical apparatus including the power source connection controller according to the present invention.

The power source connection controller and the method thereof according to the present invention are not limited to power source connection control of a microcomputer, but as shown in FIG. 7, are applicable to power source connection control of arbitrary electric and electronic circuits. The electric-electronic circuit may include a power supply circuit and the control circuit 10 controls power supply to the power supply circuit.

As described above, specific embodiments of the present invention have been described so far, but the present invention is not limited to these embodiments. Also, any modification, variations or equivalent arrangements which may occur to those skilled in the art should be considered to be within the scope of the invention.

There have thus been shown and described a power source connection controller and a power source controlling method which fulfill all the objects and advantages sought therefor. Many changes, modifications, variations and other uses and applications of the subject invention will however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A power source connection controller for an electrical apparatus, for automatically disconnecting a power source from an internal circuit of said apparatus, comprising:
- a power source connecting switch connected between said power source and said internal circuit;
- means for controlling opening and closing of said power source connecting switch, said controlling means being connected between said power source and said power source connecting switch;
- a first switch for inputting a signal to said internal circuit to provide instructions for executing a predetermined function provided for said electrical apparatus; and
- a second switch for causing said controlling means to close said power source connecting switch, said second switch being connected between said power source and said controlling means, said first and second switches operating jointly.

2. The power source connection controller according to claim 1, wherein said controlling means includes:
- means for holding the power source connecting switch closed; and
- means for releasing the power source connecting switch from the closed state, upon receipt of a power-off signal from said internal circuit.

3. The power source connection controller according to claim 2, wherein said holding means includes a connection holding switch connected in parallel with said second switch, said holding switch in closed state causing said controlling means to hold said power source connecting switch closed.

4. The power source connection controller according to claim 3, wherein said controlling means includes a relay for opening and closing said power source connecting switch and said connection holding switch.

5. The power source connection controller according to any of claim 4, wherein said power-off signal is sent from said internal circuit when no signal is inputted to said internal circuit by said first switch within a predetermined time.

6. The power source connection controller according to any of claim 5, wherein the duration of the signal inputted by said first switch which is required for said internal circuit to recognize said signal is 10 milliseconds to 1 second.

7. The power source connection controller according to any of claim 6, wherein said internal circuit includes a microcomputer.

8. The power source connection controller according to any of claim 7, wherein said first and second switches are incorporated into a single press-button switch.

9. A power source connection controlling method for an electrical apparatus, which has the function of automatically disconnecting a power source from an internal circuit of said electrical apparatus, including the steps of:
- providing instructions for said internal circuit to execute a predetermined function provided for said electrical apparatus, while said power source is shut off;
- connecting said power source to said internal circuit in synchronization with said instruction to said internal circuit; and
- allowing said internal circuit to execute the predetermined function, upon connection of said power source to said internal circuit.

10. The power source connection controlling method according to claim 9, further includes a step of disconnecting said power source from said internal circuit in response to a power-off signal from said internal circuit.

11. The power source connection controlling method according to claim 10, wherein said internal circuit sends said power-off signal when there are no instructions to said internal circuit to execute said predetermined function within a predetermined time.

12. The power source connection controlling method according to claim 11, wherein said internal circuit executes said predetermined function, when the instructions to execute the predetermined function last for 10 milliseconds to 1 second.

* * * * *